(12) United States Patent
Cogan

(10) Patent No.: US 6,373,347 B1
(45) Date of Patent: Apr. 16, 2002

(54) POWER CONTROL CIRCUITS AND METHODS

(75) Inventor: Adrian I. Cogan, Redwood Shores, CA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 09/369,405

(22) Filed: Aug. 5, 1999

(51) Int. Cl.[7] ............................... H01P 1/22; H02H 3/00

(52) U.S. Cl. .................................... 333/81 R; 361/106

(58) Field of Search ............................. 333/81 R, 81 A; 361/57, 107, 106, 113, 93.7, 93.8, 93.9; 338/22 R; 307/131, 125; 323/239, 237, 242, 324, 326, 300, 901, 908

(56) References Cited

U.S. PATENT DOCUMENTS 5,537,288 A  *  7/1996  Felps ........................ 361/124

* cited by examiner

Primary Examiner—Robert Pascal
Assistant Examiner—Kimberly E Glenn

(57) ABSTRACT

The present invention provides simple, low cost power control circuits and methods for high frequency (e.g., RF) applications. According to one embodiment of the present invention, a high frequency circuit comprises a capacitor, a PTC element and a resistor. The PTC element is heated by a high frequency input signal and changes its resistance. The change in the resistance of the PTC element controls the output power of the circuit. In another embodiment of the present invention, the circuit comprises a high frequency circuit and a control circuit. The control circuit provides a DC current to the high frequency circuit to control the resistance of the PTC element, which in turn controls the output power of the high frequency circuit. In this embodiment, two separate paths are used: one for high frequency input signals and one for DC control current.

24 Claims, 2 Drawing Sheets

POWER CONTROL CIRCUITS AND METHODS

BACKGROUND OF THE INVENTION

The invention relates generally to power control circuits and methods, and more particularly to high frequency/radio frequency (HF/RF) power control and monitoring circuits and methods.

Traditionally, PIN (P-type/Intrinsic/N-type) diodes are used in HF/RF applications, such as in power switching, power modulation and control. The operation of such diodes is well known to those skilled in the art. Briefly, a PIN diode has a very low capacitance when reverse biased. But when forward biased, its equivalent HF/RF series resistance becomes proportional to the direct current (DC) flowing through the diode.

A typical application circuit using a PIN diode is shown in FIG. 1. At the operating frequency f, the inductors L exhibit a series reactance $\omega L \gg 1/\omega C$, the series reactance of the capacitors C. The result is that the DC and the HF/RF paths are separated or isolated from each other. Therefore, in a first order approximation, the HR/RF power will not affect the PIN diode DC bias conditions.

By varying the resistance value of the resistor R or the voltage Vb, one can adjust the DC current through the diode. At the operating frequency f, the power generated by the HF/RF generator is divided between the PIN diode resistance and the load impedance Z_Load. Although impedance mismatch effects must be also taken into account, they are neglected for the purpose of this simplified illustration. By varying the DC current flowing through the PIN diode, one can adjust the HF/RF power delivered to the load impedance. Reversing the polarity of the source Vb will "turn off" the PIN diode, which causes the diode to exhibit a very low capacitance, thus isolating or disconnecting the HF/RF source from the load.

There are a number of disadvantages of using semiconductor diodes in high frequency applications, including high cost, large size, weak radiation hardness, low ruggedness, complexity and unreliability.

The present invention utilizes a positive temperature coefficient (PTC) resistor to offer new solutions for high frequency applications. PTC resistors have been used to protect the electric circuits from fault conditions, such as overcurrent, overload and overtemperature conditions. Typically, a PTC resistor is placed in series with a load, and under normal operating conditions, is in a low temperature, low resistance state. However, if the current through the PTC resistor increases excessively, and/or the ambient temperature around the PTC resistor increases excessively, then the PTC resistor will be "tripped," i.e., converted to a high resistance state such that the current is reduced substantially to a safe level. Generally, the PTC resistor will remain in the tripped state, even if the fault condition is removed, until it has been disconnected from the power source and allowed to cool. After the current and/or temperature return to their normal levels, the PTC resistor will switch back to the low temperature, low resistance state.

An example of a PTC resistor is one which is composed of a PTC conductive polymer. The largest steady state current which will not cause any of the PTC resistors in the batch to trip is referred to as the "hold current" ($I_{hold}$), and the smallest steady state current which will cause all of the devices to trip is referred to as the "trip current" ($I_{trip}$). In general, the difference between $I_{hold}$ and $I_{trip}$ decreases slowly as the ambient temperature increases, and the higher the ambient temperature, the lower the hold current and the trip current.

SUMMARY OF THE INVENTION

By using a PTC resistor in high frequency applications, the present invention provides a number of advantages including low cost, small size, strong radiation hardness, high ruggedness, simplicity and reliability.

According to one embodiment of the present invention, a high frequency circuit comprises a capacitor, a PTC element and a resistor. The PTC element is heated by a high frequency input signal and changes its resistance. The change in the resistance of the PTC element controls the output power of the circuit.

In another embodiment of the present invention, the circuit comprises a high frequency circuit and a control circuit. The control circuit provides a DC current to the high frequency circuit to control the resistance of the PTC element, which in turn controls the output power of the high frequency circuit. In this embodiment, two separate paths are used: one for high frequency input signals and one for DC control current.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DETAILED DESCRIPTION OF THE PREFERRED EMBODIMENTS

Figure 1:
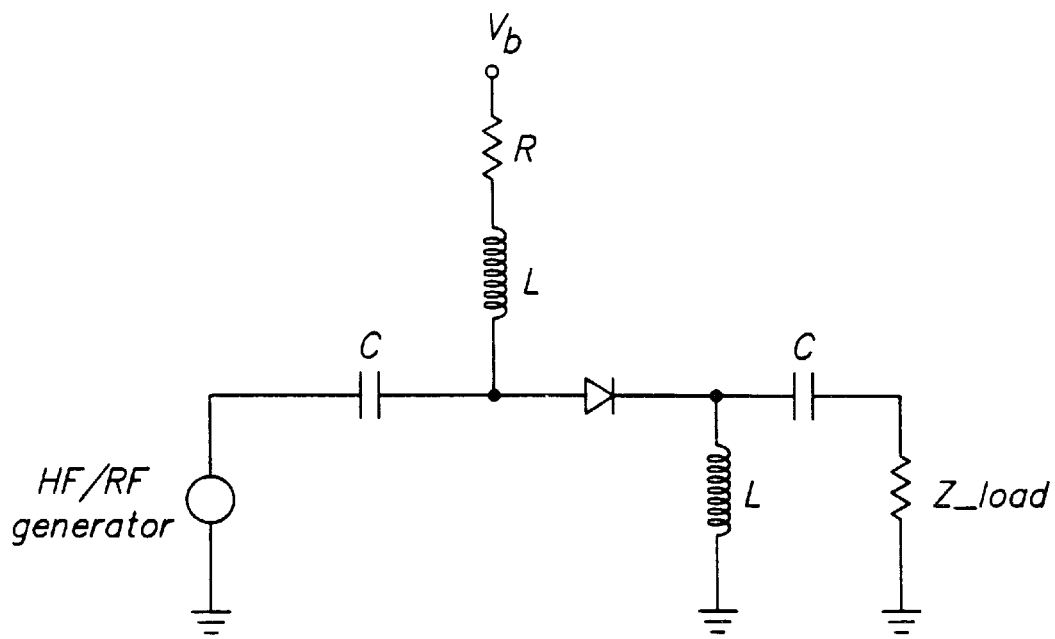
FIG. 1 shows a conventional power control circuit.
Figure 2A:
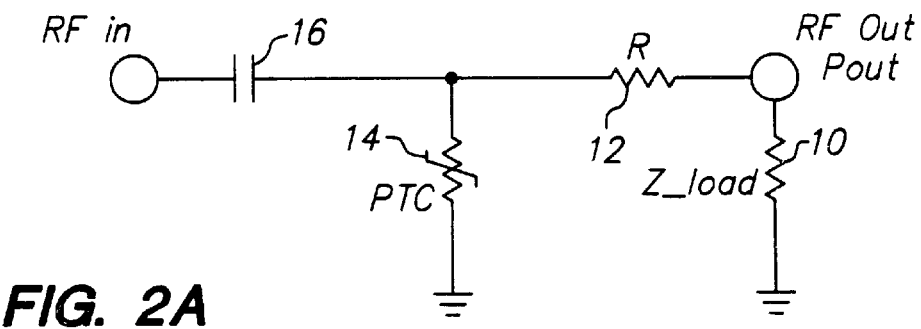
FIGS. 2A and 2B show power control circuits according to the present invention.
Figure 2B:
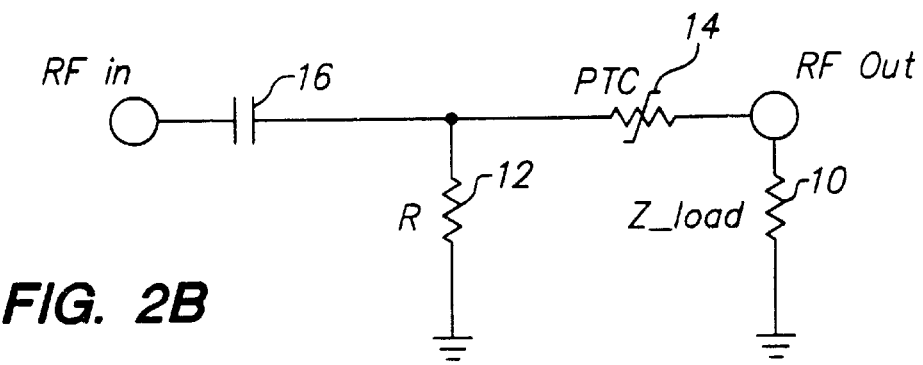

FIGS. 2A and 2B each show a power control circuit according to the present invention. In FIG. 2A, a load 10 is connected to a resistor 12 in series. A positive temperature coefficient (PTC) element, e.g., PTC resistor 14, is connected in parallel with the series circuit of resistor 12 and load 10 to form a parallel circuit. A capacitor 16 is connected in series with the parallel circuit. RF signals are input via one end of capacitor 16, as illustrated. In this circuit, PTC resistor 14 increases its resistance value as it is heated up by the RF signals, resulting in an increase in the power consumption at PTC 14. This also causes the output power, Pout, i.e., the power consumption at load 10, to increase.

In FIG. 2B, a load 10 is connected to a PTC resistor 14 in series. A resistor 12 is connected in parallel with the series circuit of PTC 14 and load 10 to form a parallel circuit. A capacitor 16 is connected in series with the parallel circuit. RF signals are input via one end of capacitor 16, as illustrated. As in FIG. 2A, PTC resistor 14 increases its resistance value as it is heated up by the RF signals, resulting in an increase in the power consumption at PTC 14. This increase, however, causes the output power, Pout, to decrease.

Figure 3A:
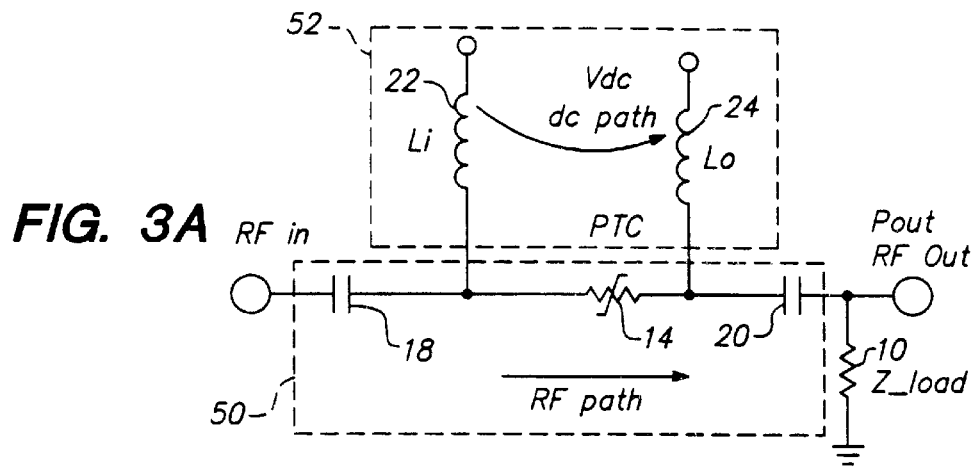
FIGS. 3A and 3B show power control circuits according to alternative embodiments of the present invention.
Figure 3B:
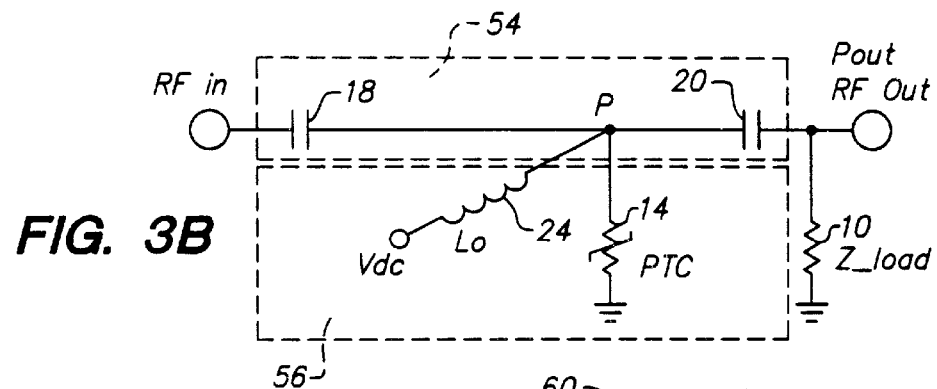

FIGS. 3A and 3B show alternative embodiments of the invention in which output power is controlled by using separate paths for the DC and high frequency, e.g., RF, signals. In FIG. 3A, a load 10 is connected to a high frequency circuit 50, which includes capacitors 18 and 20 and PTC resistor 14 connected to one another in series. A control circuit 52 is connected to PTC resistor 14 in parallel. Control circuit 52 includes inductors 22 and 24, which are connected to the two ends of PTC resistor 14, respectively. A DC voltage Vdc is to be applied to the other ends of inductors 22 and 24 for controlling the tripping of PTC resistor 14. The power output is thus controlled by the DC current through inductors 22 and 24. When sufficient DC current is provided, PTC resistor 14 trips and becomes a large resistance which increases its isolation between the input and output ports, thus reducing the output power, Pout, of the circuit. In this circuit, inductors 22 and 24 are used to block the RF signals. By controlling the PTC resistance, one can control and adjust the Pout/Pin ratio.

FIG. 3B shows a complementary variation of the circuit in FIG. 3A. In FIG. 3B, a load 10 is connected to a high frequency circuit 54, which includes capacitors 18 and 20 connected in series. A control circuit 56, which includes a PTC resistor 14 and an inductor 24, is connected to high frequency circuit 54. PTC resistor 14 has its one end connected to a point P between capacitors 18 and 20 and its other end connected to the ground. Inductor 24 has its one end connected to the point P and its other end connected to a DC voltage power, Vdc. In this embodiment, the output power will be zero, i.e., Pout=0, unless a DC current is provided through inductor 24 to cause PTC 14 to increase its resistance. Thus, Vdc controls the output power, 30 Pout, of the circuit. The circuits shown in FIGS. 3A and 3B can be used for power monitoring and control, e.g., as a switch or a linear modulator.

Figure 4:
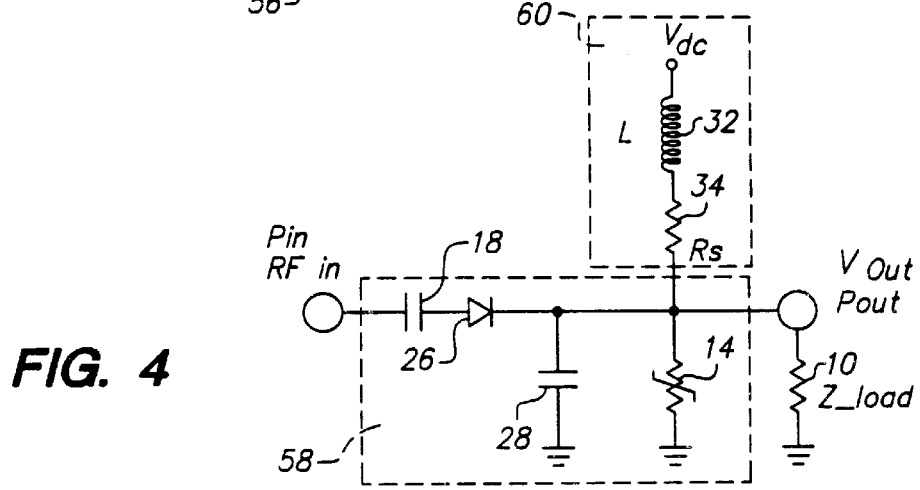
FIG. 4 shows a power control circuit according to another embodiment of the present invention.

FIG. 4 shows another embodiment of the invention, in which overpower protection is provided. In FIG. 4, a load 10 is connected to a high frequency circuit 58, which is connected to a control circuit 60. In high frequency circuit 58, a PTC resistor 14 is connected to a capacitor 28 in parallel. The parallel circuit of capacitor 28 and PTC resistor 14 is connected in series to a diode 26 and a capacitor 18. RF signals are input via capacitor 18 Diode 26 provides signal rectification for input RF signals. PTC resistor 14 is also connected in series to a resistor 34 and an inductor 32 of control circuit 60. A DC voltage Vdc is to be applied at one end of inductor 32 for controlling the tripping of PTC resistor 14 to increase its resistance and thus the output voltage Vout and the output power Pout. The output voltage Vout depends not only on the input power, Pin, but the Vdc voltage level and the ratio of the resistance values of resistors 34 and PTC 14.

Figure 5:
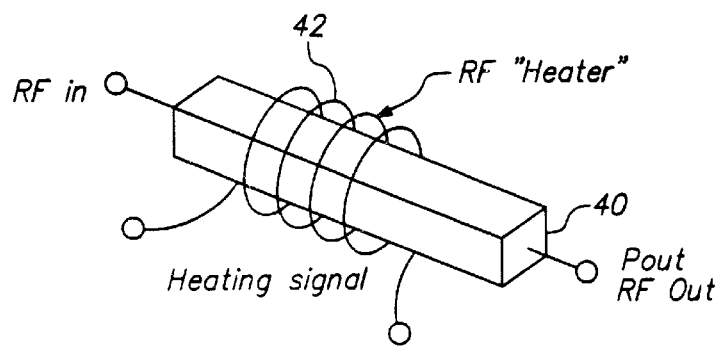
FIG. 5 shows a PTC element according to the present invention.

FIG. 5 illustrates a PTC resistor according to an embodiment of the invention. The PTC resistor includes a rod 40, made of conductive polymer, which is wound around with a conductive wire 42 that acts as a RF heater. The output power, Pout, is controlled by a separate heating signal. Pout decreases as the heating signal increases because the heating signal causes the PTC to increase its resistance and thus its power consumption.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications and variations as may fall within the spirit and scope of the appended claims.

What is claimed is:

1. A high frequency circuit, comprising:
 a capacitor having first and second ends, with its first end for receiving high frequency input signals which are radio frequency (RF) signals;
 (b) a positive temperature coefficient (PTC) element having first and second ends, with its first end connected to the second end of the capacitor and its second end connected to a reference level which is a ground level; and
 (c) a resistor having first and second ends, with its first end connected to the first end of the PTC element and its second end for connecting to a load and for providing a high frequency output.

2. A high frequency circuit, comprising:
 (a) a capacitor having first and second ends, with its first end for receiving high frequency input signals;
 (b) a resistor having first and second ends, with its first end connected to the second end of the capacitor and its second end connected to a reference level; and
 (c) a positive temperature coefficient (PTC) element having first and second ends, with its first end connected to the first end of the resistor and its second end for connecting to a load and for providing a high frequency output.

3. The circuit of claim 2, wherein the high frequency input signals are radio frequency (RF) signals and the reference level is a ground level.

4. A circuit, comprising:
 (a) a high frequency circuit including first and second capacitors and a positive temperature coefficient (PTC) element connected to one another in series, the high frequency circuit having a first terminal for receiving high frequency input signals and a second terminal for providing a high frequency output; and
 (b) a control circuit connected in parallel with the PTC element for providing a DC current to the PTC element to control its resistance.

5. The circuit of claim 4, wherein:
 the first capacitor is an input capacitor and includes first and second ends, with its first end for receiving the high frequency input signals,
 the PTC element includes first and second ends, with its first end connected to the second end of the first capacitor,
 the second capacitor is an output capacitor and includes first and second ends, with its first end connected to the second end of the PTC element and its second end for connecting to a load and for providing an output power.

6. The circuit of claim 5, wherein the high frequency input signals are radio frequency (RF) signals.

7. The circuit of claim 4, wherein the control circuit includes:
 (i) a first inductor having first and second ends, with its first end connected to the first end of the PTC element and its second end for connecting to a DC power source, and
 (ii) a second inductor having first and second ends, with its first end connected to the second end of the PTC element and its second end for connecting to the DC power source.

8. A circuit, comprising:
 (a) a high frequency circuit including:
  (i) a first capacitor,
  (ii) a second capacitor connected in series with the first capacitor, and (iii) a positive temperature coefficient (PTC) element having first and second ends, with its first end connected between the first and second capacitors and its second end connected to a reference level;

wherein the high frequency circuit having a first terminal for receiving high frequency input signals and a second terminal for providing a high frequency output; and b) a control circuit coupled to the high frequency circuit for controlling the high frequency output, the control circuit including an inductor having first and second ends, with its first end for connecting to a DC power source and its second end connected to the first end of the PTC element, and wherein a DC current from the DC power source controls the resistance of the PTC element so as to control the high frequency output.

9. The circuit of claim 8, wherein the high frequency input signals are radio frequency (RF) signals and the reference level is a ground level.

10. The circuit of claim 8, wherein:

the first capacitor is an input capacitor and includes first and second ends, with its first end for receiving the high frequency input signals, and the second capacitor is an output capacitor and includes first and second ends, with its first end connected to the second end of the first capacitor and its second end for connecting to a load and for providing the high frequency output.

11. A circuit, comprising:

(a) a high frequency circuit including:
  (i) a first capacitor,
  (ii) a diode connected in series with the first capacitor to form a first series circuit;
  (iii) a second capacitor, and
  (iv) a positive temperature coefficient (PTC) element connected in parallel with the second capacitor to form a parallel circuit, wherein the first series circuit has its one end for receiving high frequency input signals and its other end connected in series with the parallel circuit;

wherein the parallel circuit is for connecting in parallel with a load and for providing a high frequency output; and (b) a control circuit connected in series with the parallel circuit for providing a DC current to control the resistance of the PTC element so as to control the high frequency output.

12. The circuit of claim 11, wherein the control circuit includes an inductor connected in series with a resistor to form a second series circuit;

wherein the second series circuit has its one end connected in series with the parallel circuit and its other end for connecting to a DC power source.

13. The circuit of claim 12, wherein the parallel circuit has its one end connected to a reference ground and its other end connected to the first series circuit and for connecting to the load.

14. The circuit of claim 13, wherein the high frequency input signals are radio frequency (RF) signals and the reference level is a ground level.

15. A method, comprising the steps of:

(a) receiving high frequency input signals via an input terminal of a high frequency circuit which includes a positive temperature coefficient (PTC) element;

(b) providing a high frequency output via an output terminal of the high frequency circuit; and (c) providing a DC current to the high frequency circuit, using a control circuit, to control the resistance of the PTC element so as to control the high frequency output.

16. The method of claim 15, wherein the high frequency circuit further includes first and second capacitors connected to the PTC element in series.

17. The method of claim 16, wherein step (b) includes the step of connecting the control circuit in parallel with the PTC element, the control circuit including a first inductor, a second inductor and a DC power source; wherein the first and second inductors and the DC power source are connected to one another in series.

18. The method of claim 15, wherein the high frequency circuit further includes first and second capacitors connected to each other in series, wherein the PTC element has its one end connected between the two capacitors and its other end connected to a reference level.

19. The method of 18, wherein step (c) includes the step of connecting the control circuit to the high frequency circuit, the control circuit including an inductor and a DC power source connected to each other in series;

wherein the inductor has first and second ends, with its first end connected to the DC power source;

wherein the PTC element has first and second ends, with its first end connected to the second end of the inductor and its second end connected to a reference level.

20. The method of claim 18, wherein the reference level is a ground level.

21. The method of 15, wherein the high frequency circuit further includes:

(i) a first capacitor,
(ii) a diode connected in series with the first capacitor to form a first series circuit;
(iii) a second capacitor connected in parallel with the PTC element to form a parallel circuit, wherein the first series circuit has its one end as the input terminal of the high frequency circuit for receiving the high frequency input signals and its other end connected in series with the parallel circuit;

wherein the parallel circuit has an end as the output terminal of the high frequency circuit for providing the high frequency output.

22. The method of claim 21, wherein step (c) includes the step of connecting the control circuit in series with the parallel circuit, the control circuit including an inductor, a resistor and a DC power source connected to one another in series to form a second series circuit.

23. The method of claim 22, wherein the parallel circuit has its one end connected to a reference level and its other end connected to the first series circuit as the output terminal of the high frequency circuit.

24. The method of claim 23, wherein the reference level is a ground level.

* * * * *